Patented Aug. 28, 1923.

1,466,246

UNITED STATES PATENT OFFICE.

HERBERT A. PARKYN, OF CHICAGO, ILLINOIS.

FIREPROOF WALL BOARD.

No Drawing. Application filed October 13, 1920. Serial No. 416,691.

*To all whom it may concern:*

Be it known that I, HERBERT A. PARKYN, a citizen of the United States, and a resident of Chicago, Cook County, State of Illinois, have invented a certain new and useful Fire-Proof Wall Board, of which the following is a specification.

The invention relates to wall board composed principally of fibrous material.

An object of the invention is to provide a cheap and efficient fire-proof wall board.

The wall board of my invention is composed principally of fibrous material that is more or less heat resistant and which has slow burning characteristics. With this material is mixed a proportion of heat resistant material, which renders the mixture flameproof and practically fire-proof.

The base material may comprise a suitable fibrous material such as paper pulp, rice hulls, slow burning barks, the residue left on the shaker screen in paper mills or other comparable materials. In practice, I prefer to employ paper pulp mixed with a proportion of one or more of the other materials. With this base material I mix asbestos or an asbestos product, preferably a finely divided product manufactured from the asbestos sand that is discharged as waste from asbestos mills. This product and the method of making it are fully described in the Letters Patent of H. S. Ashenhurst, Patent Number 1,317,852, and Patent Number 1,317,853. This product contains asbestos and is largely composed of the double silicate of calcium and magnesium and contains an appreciable quantity of a water soluble silicate. The substance is relatively finely divided, no fiber being apparent to the naked eye. This asbestos waste product is mixed with the base material, a suitable quantity of a soluble silicate, such as sodium silicate and sufficient water to make the mass fluid. I prefer to form the mixture of substantially 60% to 65% of paper pulp and 35% to 40% of the asbestos waste product, although these proportions are variable. When other fibrous material that is hard to ignite, such as redwood bark or rice hulls, is added to the mixture, it may be used to displace a portion of the asbestos product.

The fluid pulp mixture is charged into a tank and a screen submerged therein. A reduction of pressure on the rear side of the screen, usually referred to as a vacuum, causes a substantially even layer of the mixture to adhere to the screen. When the desired thickness of the sheet is obtained, the screen is raised from the tank, while maintaining the vacuum to remove excess moisture from the sheet and compact the mass. The screen is then placed over a table and air under pressure admitted behind the screen, to dislodge the sheet, which is then dried. When desired, the sheet may be pressed before it is dried, but I prefer the unpressed sheet on account of its greater heat insulating properties. Instead of mixing the sodium silicate with the other materials, it may be omitted from the mixture and applied to the surface of the sheet, either by dipping or spraying.

Instead of incorporating the asbestos waste product with the paper pulp and forming a mixture that is accumulated in a more or less homogeneous mixture of a screen, the sheet may be formed of the paper pulp and after being removed from the screen, and while still moist, a coating of fireproofing material is applied thereto, either by spraying or dipping. The fireproofing material comprises a mixture of asbestos or the waste asbestos product, sodium silicate and sufficient water to bring the mixture to the desired fluid consistency. I find that substantially equal parts of sodium silicate and water in the mixture produce satisfactory results.

Immediately after the material is spread and the atmospheric air is given free access thereto the excess water is evaporated, the reaction between the silicates of the asbestos product and the water begins and the sodium silicate hardens and binds the whole mass together, producing a very efficient fire-proof wall board.

I claim:

1. A fire-proof wall board comprising a dried unpressed board formed of a mixture of difficultly ignitible fibrous material, a soluble silicate and asbestos.

2. A fire-proof wall board comprising a dried unpressed board formed of a mixture of paper pulp, a soluble silicate and asbestos.

3. A fire-proof wall board comprising a mixture of paper pulp, and other slow burning fibrous material, a soluble silicate and asbestos.

4. A fire-proof wall board comprising a mixture of heat resistant fibrous material, a soluble silicate and the finely divided product formed from the waste of asbestos mills.

5. A fire-proof wall board, comprising paper pulp, a soluble silicate and the finely divided product formed from the waste of asbestos mills.

6. A fire-proof wall board, comprising a dried, unpressed board formed of paper pulp, sodium silicate and the finely divided product formed from the waste of asbestos mills.

7. A fire-proof wall board, comprising paper pulp, difficultly ignitible fibrous material, sodium silicate and the finely divided product formed from the waste of asbestos mills.

8. A fire-proof wall board, comprising a sheet formed of a substantially homogeneous mixture of paper pulp, the finely divided product formed from the waste of asbestos mills and a binder.

9. A fire-proof wall board, comprising a sheet of fibrous material having the finely divided product formed from the waste of asbestos mills intimately mixed with the fibrous material.

10. A fire-proof wall board, comprising a sheet composed substantially of paper pulp, sixty to sixty-five parts and the finely divided product formed from the waste of asbestos mills, thirty-five to forty parts.

In testimony whereof I have hereunto set my hand.

HERBERT A. PARKYN.